United States Patent
Bisht et al.

(10) Patent No.: US 10,102,327 B2
(45) Date of Patent: Oct. 16, 2018

(54) INTEGRATED CIRCUIT LAYOUT WIRING FOR MULTI-CORE CHIPS

(71) Applicant: STMicroelectronics, Inc., Coppell, TX (US)

(72) Inventors: Chetan Bisht, Duluth, GA (US); Harry Scrivener, III, Lawrenceville, GA (US)

(73) Assignee: STMICROELECTRONICS, INC., Coppell, TX (US)

( * ) Notice: Subject to any disclaimer, the term of this patent is extended or adjusted under 35 U.S.C. 154(b) by 43 days.

(21) Appl. No.: 14/871,584

(22) Filed: Sep. 30, 2015

(65) Prior Publication Data
US 2016/0188777 A1     Jun. 30, 2016

Related U.S. Application Data

(60) Provisional application No. 62/099,094, filed on Dec. 31, 2014.

(51) Int. Cl.
*G06F 17/50*     (2006.01)
*H03K 19/0175*     (2006.01)
(Continued)

(52) U.S. Cl.
CPC ...... *G06F 17/5077* (2013.01); *G06F 17/5072* (2013.01); *H03K 19/017509* (2013.01); *H03F 3/195* (2013.01); *H03F 3/602* (2013.01)

(58) Field of Classification Search
CPC . H01L 2224/4813; H03F 3/195; H03F 3/602; G06F 17/5072; G06F 17/5077; H03K 19/017509
See application file for complete search history.

(56) References Cited

U.S. PATENT DOCUMENTS

| 5,146,428 A | 9/1992 | Tanimura |
| 5,304,826 A * | 4/1994 | Ichikawa ......... H01L 27/11807 257/202 |

(Continued)

FOREIGN PATENT DOCUMENTS

EP     1 538 540 A2     6/2005

OTHER PUBLICATIONS

Wu et al., "LILA: Layout Generation for Iterative Logic Arrays," *IEEE Transactions on Computer-Aided Design of Integrated Circuits and Systems* 14(11):1359-1369, 1995.

(Continued)

*Primary Examiner* — Helen Rossoshek
(74) *Attorney, Agent, or Firm* — Seed IP Law Group LLP

(57) ABSTRACT

An integrated circuit system-on-chip (SOC) includes a semiconductor substrate, a plurality of components made up of transistors formed in the substrate, and a plurality of interconnection lines providing electrical connectivity among the components. Use of a channel-less design eliminates interconnection channels on the top surface of the chip. Instead, interconnection lines are abutted to one another in a top layer of metallization, thus preserving 5-10% of chip real estate. Clock buffers that are typically positioned along interconnection channels between components are instead located within regions of the substrate that contain the components. Design rules for channel-less integrated circuits permit feed-through interconnections and exclude multi-fanout interconnections.

18 Claims, 12 Drawing Sheets

(51) Int. Cl.
*H03F 3/195* (2006.01)
*H03F 3/60* (2006.01)

(56) References Cited

U.S. PATENT DOCUMENTS

| | | | |
|---|---|---|---|
| 5,497,108 A * | 3/1996 | Menon | H03K 19/1736 |
| | | | 326/39 |
| 6,282,147 B1 * | 8/2001 | Fujima | G11C 8/12 |
| | | | 365/230.06 |
| 6,467,074 B1 | 10/2002 | Katsioulas et al. | |
| 6,925,627 B1 | 8/2005 | Longway et al. | |
| 6,980,765 B2 | 12/2005 | McStravick et al. | |
| 7,487,488 B1 | 2/2009 | Huang et al. | |
| 7,603,644 B2 | 10/2009 | Waller | |
| 7,700,410 B2 | 4/2010 | Bernstein et al. | |
| 8,080,442 B2 | 12/2011 | Leedy | |
| 8,407,650 B1 | 3/2013 | Avidan et al. | |
| 8,456,856 B2 * | 6/2013 | Lin | H01L 23/60 |
| | | | 257/686 |
| 8,918,689 B2 | 12/2014 | Kulkarni et al. | |
| 8,975,725 B2 * | 3/2015 | Hamada | H01L 23/5225 |
| | | | 257/528 |
| 9,495,309 B2 * | 11/2016 | Sauber | G06F 13/1684 |
| 9,632,140 B2 | 4/2017 | Kulkarni et al. | |
| 9,660,584 B2 * | 5/2017 | Modi | H03F 1/0205 |
| 9,680,765 B2 | 6/2017 | Kaul et al. | |
| 2002/0097068 A1 * | 7/2002 | Morgan | H04L 25/242 |
| | | | 326/86 |
| 2004/0232982 A1 * | 11/2004 | Ichitsubo | H01L 23/66 |
| | | | 330/129 |
| 2005/0116738 A1 | 6/2005 | Auracher et al. | |
| 2006/0055065 A1 | 3/2006 | Liu et al. | |
| 2010/0231263 A1 * | 9/2010 | Fish | H03K 19/0948 |
| | | | 326/121 |
| 2010/0306440 A1 | 12/2010 | Sauber | |
| 2012/0272112 A1 | 10/2012 | Oh et al. | |
| 2013/0341704 A1 | 12/2013 | Rachmady et al. | |
| 2016/0104517 A1 * | 4/2016 | Park | H03K 19/01750 |
| | | | 365/189.17 |
| 2016/0188777 A1 | 6/2016 | Bisht et al. | |
| 2016/0191058 A1 * | 6/2016 | Bisht | H03K 19/01750 |
| | | | 326/63 |
| 2017/0091365 A1 | 3/2017 | Gudala et al. | |
| 2017/0177534 A1 | 6/2017 | Mohseni et al. | |

OTHER PUBLICATIONS

Dhami et al., "Using SOC Olympus for Area Advantage on Channel-Less Design," User2User Presentation, Dec. 6, 2013, 21 pages.

* cited by examiner

INTEGRATED CIRCUIT LAYOUT WIRING FOR MULTI-CORE CHIPS

BACKGROUND

Technical Field

This disclosure relates to the field of integrated circuit (IC) chip architecture and layout, and more particularly to the efficient routing of interconnect lines and bus lines.

Description of the Related Art

FIG. 1 is a block diagram of one example of a multi-core computer architecture in which numerous buses carry data between partitioned sections of a conventional integrated circuit die 10. In particular, the integrated circuit die 10 is a system-on-chip (SOC) that contains microelectronic components having transistors and interconnect wiring formed in a semiconductor substrate. The microelectronic components generally include one or more microprocessors 14 and a number of support components 12 that support operations of the microprocessors 14. The microprocessors 14 can include, for example, central processing units (CPUs), graphics processors, digital signal processors (DSPs), microcontrollers, and the like. The support components 12 can include any of the many types of operating units on the integrated circuit die 10, including memory, which may be RAM, ROM, EPROM, flash, cache, and the like. The support components 12 may also include memory exchange interfaces, shift registers, accelerator logic blocks, peripheral circuits, arithmetic logic units (ALUs), display drivers, power supplies, voltage regulators, clock circuits, timers, and any number of memory arrays or logic units that are required for the integrated circuit die 10 to operate properly. An SOC integrated circuit die may be used to build, for example, multimedia content receivers such as cable or satellite TV set top boxes; cable and internet modems; wireless routers; laptop computers; tablet computers; smartphones, or other electronic hardware items.

With the proliferation of multi-core chip architectures, the need for many wiring layers to interconnect all the different support components 12 and the microprocessors 14 to each other has greatly proliferated. Accordingly, a large number of buses 16, along with bus bridge circuits 18, are now required on the integrated circuit die 10 in order to properly connect all of the components to each other and ensure proper chip operation.

Interconnection lines, generally referred to as buses 16, provide connectivity between the various support components 12 and microprocessors 14. In addition, bus bridge circuits 18 link the buses to each other. Any component on the integrated circuit die 10 can be coupled to any other component for which it needs a connection for proper operation.

FIG. 2A illustrates an existing exemplary layout of the integrated circuit die 10, which is a system-on-chip (SOC) having a die size of about 100-120 mm$^2$. In FIG. 2A, structures similar to those shown in FIG. 1 are labeled with the same reference numbers. FIG. 2A clearly shows the interconnects of the integrated circuit die 10, which has a multi-core microprocessor architecture generally of the type as shown in FIG. 1. Specifically, the layout shown in FIG. 2A indicates locations of a number of microprocessors 14, support components 12, including memory units, a number of ALUs, DSPs, bus bridge circuits, and other support components 12, relative to the buses 16. The circuit designs for the various components are grouped together and organized into separate units, or design partitions 15, and arranged on the integrated circuit die 10 at convenient locations. The design partitions 15 may or may not be aligned with physical boundaries of the various microelectronic components. Specifically, the chip design shown in FIG. 2A includes a number of support components 12 as well as microprocessors 14 that can be considered as a group within each design partition 15.

In FIG. 2A, a number of buses 16 connect the various components with each other using channels 17. As detailed in the enlarged view in FIG. 2C, the channels 17 are regions of open space on a chip, located between design partitions 15 that are set aside specifically to accommodate the buses 16 to route signals and data between different components. The channels 17 are selected areas outside of any partition 15 reserved for electrical interconnections in the buses 16 that provide main communication arteries for wires connecting the different components. According to existing architectures a number of channels 17 are provided that are routed through various portions of the integrated circuit die 10, which can be seen in FIG. 2A as electrical wires running along the surface of the chip to connect the various components.

Conventional chip designs typically require that all of the interconnection lines and buses 16 between major partitions 15 and components 12 run in the channels 17 so that noise is suppressed and proper maintenance of clock signals is provided. Specifically, a number of amplifiers, repeat stations, and clock buffer circuits are provided in the silicon substrate under the channels 17 in order to maintain and provide consistent clock signals to the different components at the proper strength as they travel to different components in the integrated circuit die 10.

On an SOC die of size 100-120 mm$^2$, some of the channels 17 may be up to 100-150 µm wide to accommodate thousands of interconnecting wires, which would otherwise be usable chip real estate. The channels 17 may take up in the range of 5-8% of the surface area of the die, generally occupying, on average, approximately 6% of the chip area. In addition, the requirement to run interconnection lines and buses 16 within the channels 17 causes the lines to be significantly longer than would otherwise be needed if a direct connection were possible. This slows down chip operation, requires additional clock buffer circuits, and introduces delays. For example, clock delays and signal propagation delays may occur, which delays interfere with efficient chip operation and must be accommodated for by additional circuits.

BRIEF SUMMARY

According to principles of the embodiments as discussed herein, interconnection lines in a system-on-chip run directly between partitions and are not required to be within pre-established channels. In a preferred embodiment, either no channels, or few channels around the periphery of the chip are used to connect the integrated circuit components to each other. Instead, buses and other interconnection lines are routed directly from one partition to another, and utilizing transistors that are located within the partition to provide buffer circuits to reinforce the strength of the signals and data. This is accomplished by providing a small region having between a few dozen and a few hundred transistors which are set aside at appropriate locations within each partition in order to provide the buffer circuit for the interconnection buses as they pass directly through a partition which does not make use of the signals so they may be properly transported to the partition in which they will be used. This is accomplished during the design process by, after forming the initial structural layout, determining the partitions which are required to be connected to each other, and then establishing feed-through interconnection locations, after which a floor plan is created that includes the appropriate buffer stations located within the partitions through which the signal passes.

DETAILED DESCRIPTION

Figure 1:
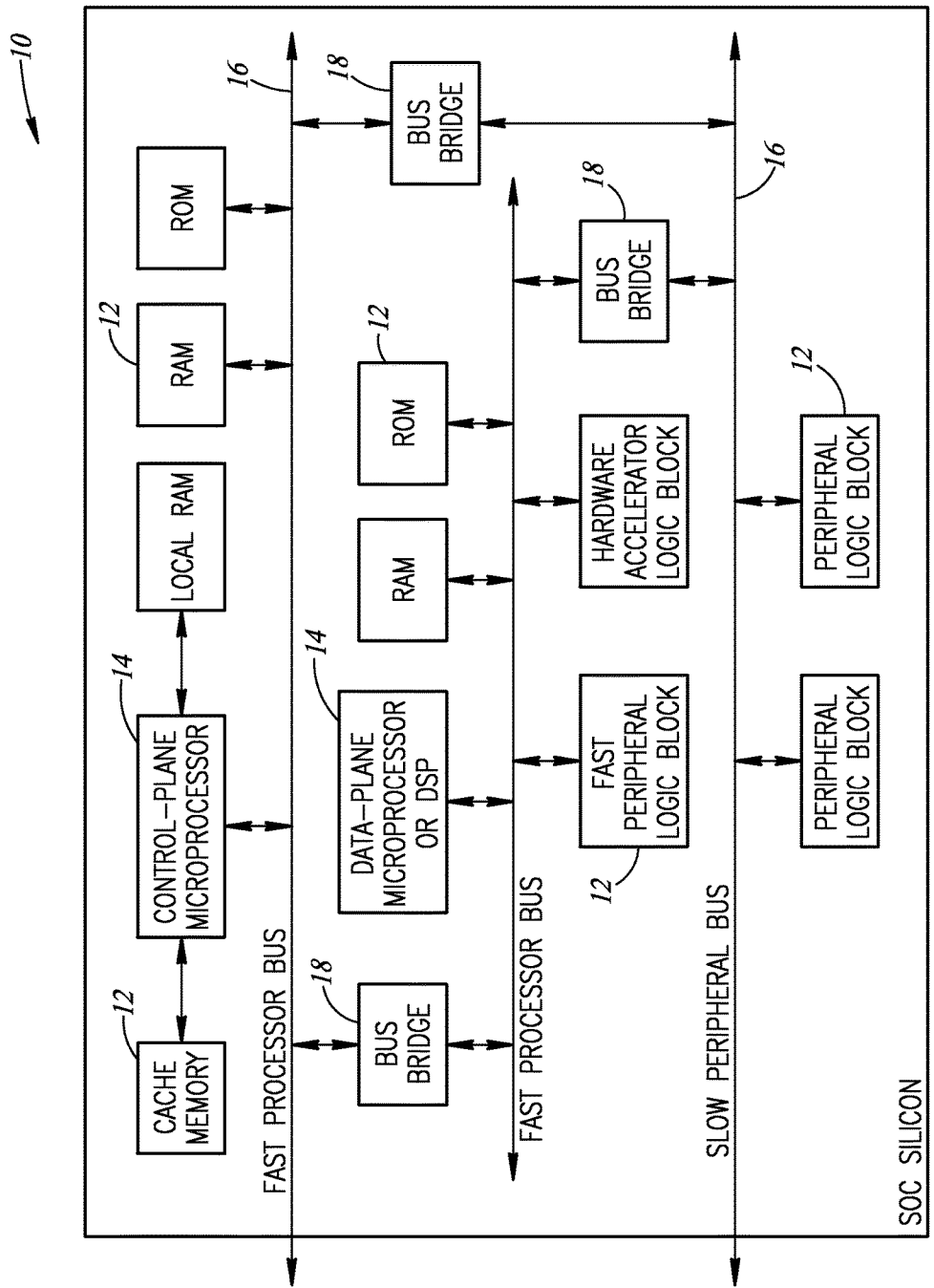
FIG. 1 is a schematic block diagram of one example of a system-on-chip (SOC) integrated circuit die and multiple bus interconnect lines.
Figure 2B:
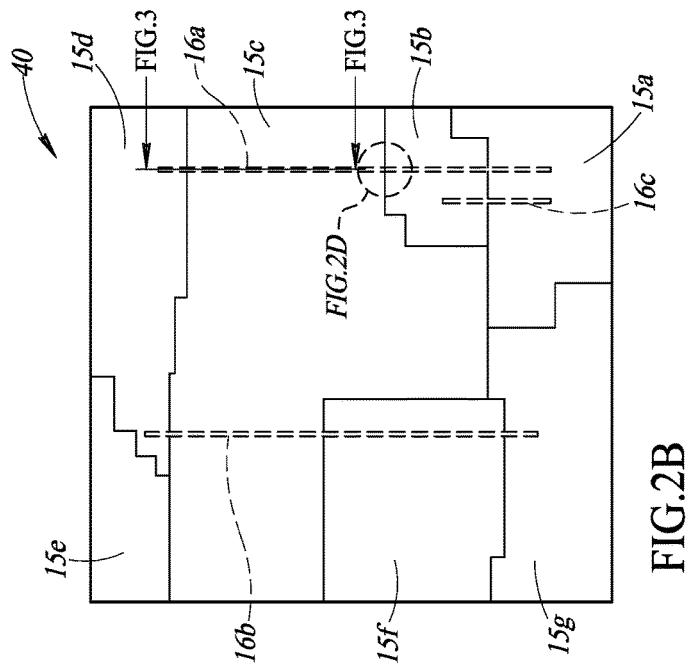
FIG. 2B is a top plan view of an SOC layout in which partitions are directly coupled to each other by abutting interconnects, without the use of individual channels, according to one embodiment described herein.
Figure 2D:
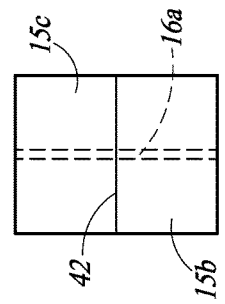
FIGS. 2C, 2D show details of FIGS. 2A, 2B, respectively.

FIG. 2B illustrates a channel-less integrated circuit architecture 40, according to one embodiment. The channel-less integrated circuit architecture 40 is formed on a semiconductor substrate as a die having a multicore architecture that includes numerous bus lines that are not routed in channels. In particular, the channel-less integrated circuit architecture 40 of FIG. 2B generally includes buses 16 routed directly between components 12 without the use of dedicated channels that occupy space on the top surface of the chip. The channel-less integrated circuit architecture 40 includes a number of integrated circuit components as previous described with respect to FIG. 1. Each of these components 12 is placed within a selected region, or partition 15, of the total chip area on the surface of the semiconductor substrate. The components 12 are connected to one another via local lines, routed below the top surface of the chip, that directly abut one another at junctions 42 as shown in the enlarged view of FIG. 2D. In the example shown, partition 15a is connected to partition 15d via a bus labeled 16a. Partition 15a is coupled to partition 15b on bus 16c. Partition 15d is coupled to partition 15g by the interconnection bus 16b. As can be seen, the buses 16 run directly from one partition 15 to another, passing through intervening partitions. The interconnection bus lines 16 may be all or substantially within a layer below, but close to, the surface of the substrate. Additionally or alternatively, the interconnection bus lines may be routed vertically to underlying layers by way of interconnection vias and contacts formed in the integrated circuit die 40. Exposed wiring on the surface of the die is limited to a peripheral area around the edges of the channel-less integrated circuit chip 40. Consequently, no substantial portion of the total chip area is dedicated to the buses 16.

When a bus 16 is long, such as 16a, one problem that arises is that the signal loses strength as it passes from partition 15a on one side of the die to partition 15d, located on the other side of the die. Because of the distance over which the bus signals are propagated, and the low voltage and current desired, signals that travel between partitions 15a and 15d must be reinforced, or otherwise refreshed at various intermediate locations between the two partitions in order to ensure that the signal is not degraded or lost completely due to noise, line losses, or other transmission problems. Accordingly, a number of buffer circuits are provided along bus 16a in order to refresh and strengthen the signal as it is carried on the interconnection lines from the partition 15a to the partition 15d. A buffer circuit is any circuit that strengthens and refreshes the signal as it passes along the signal line. The buffer circuit may be any one of a number of acceptable circuits, including an amplifier, a repeater circuit, a relay circuit, or any of a number of known circuits that accept a weak signal as input, strengthen the signal by boosting the voltage and/or current, and then put the signal back on the transmission line, which signal has been restored to its original voltage and current levels so that it may continue to travel toward its destination without incurring a net loss.

According to the principals of the embodiments discussed herein, the strength of a signal refers to the power with which the signal is propagated. There are at least two ways to increase the strength, increase the current of the signal and/or increase the voltage of the signal. As a signal is transmitted from a first location to a second location, the current might decrease due to parasitic elements along the path that place a node on the transmission line and bleed small amounts of current off the transmission line. The voltage may decrease as the signal is transmitted from the first location to the second. Namely, due to the resistance in the transmission line, there might be a reduction in voltage during the transmission along that line of a signal. As one example, assume a circuit in which a digital 1 has a value of 3 volts and a digital 0 has a value of 0 Volts. In such a system, the digital value of a signal at 1.5 V, cannot clearly be determined. Further, if the signal has a value between 1.3 V and 1.7 V, some circuits might make an error in properly recognizing that signal as a 1 or a 0.

If a digital signal having a value of 1 is placed on the transmission line, bus 16, the signal having a value of 3 volts, as the signal travels along the line, the voltage may drop to 2.8 volts. Then, at a farther point along the line, it might be 2.5 V or 2.3 V. While it would still be considered a logical 1 at a value of 2.3 volts, if it drops much further, it might reach a value at which it might be interpreted by some circuits as a digital 0. It desirable to ensure that the voltage does not decrease (or increase) sufficient that its value might be considered to have changed from its original value. Accordingly, the buffer circuit will receive as an input the signal at 2.3 V and output the signal at a full 3 V, or as 0.7 volts and output it as 0 volts. It may also increase the current in the signal or increase both the voltage and the current. The buffer circuits may, in some instances, include error correction circuits, noise cancellation circuits, and other circuits, in order to ensure that the original signal which was sent by a component within partition 15a is properly refreshed and continues to be transmitted along the line towards its destination of partition 15d. Depending on the type of circuitry used, a buffer circuit may involve several dozen transistors in order to provide the proper amplification and buffering or, in some instances, may include several hundred or a few thousand transistors. An individual partition 15, for example, may be included in the range of 4-8 million transistors. The buffer circuits are placed at the necessary locations along the transmission bus line 16a by providing connection vias, contacts, and interconnection lines from the bus 16a down to the silicon substrate where the buffer circuits are located. A very small space is allocated out of the partition 15b and/or 15c in order to provide the buffer circuits for the bus line 16a. Namely, a small amount of the area directly underneath the bus line 16a is set aside and not used by the partition 15b and/or 15c. This small area which may contain, as previously stated, several dozen transistors or, in some cases, a few hundred transistors, provides the buffer circuit which is dedicated for buffering the signal traveling on the bus line 16a from partition 15a to 15d. It is therefore not used by the partition in which it is located but rather, is set aside for use as a buffering station for various bus lines that pass through the partition.

Figure 3:
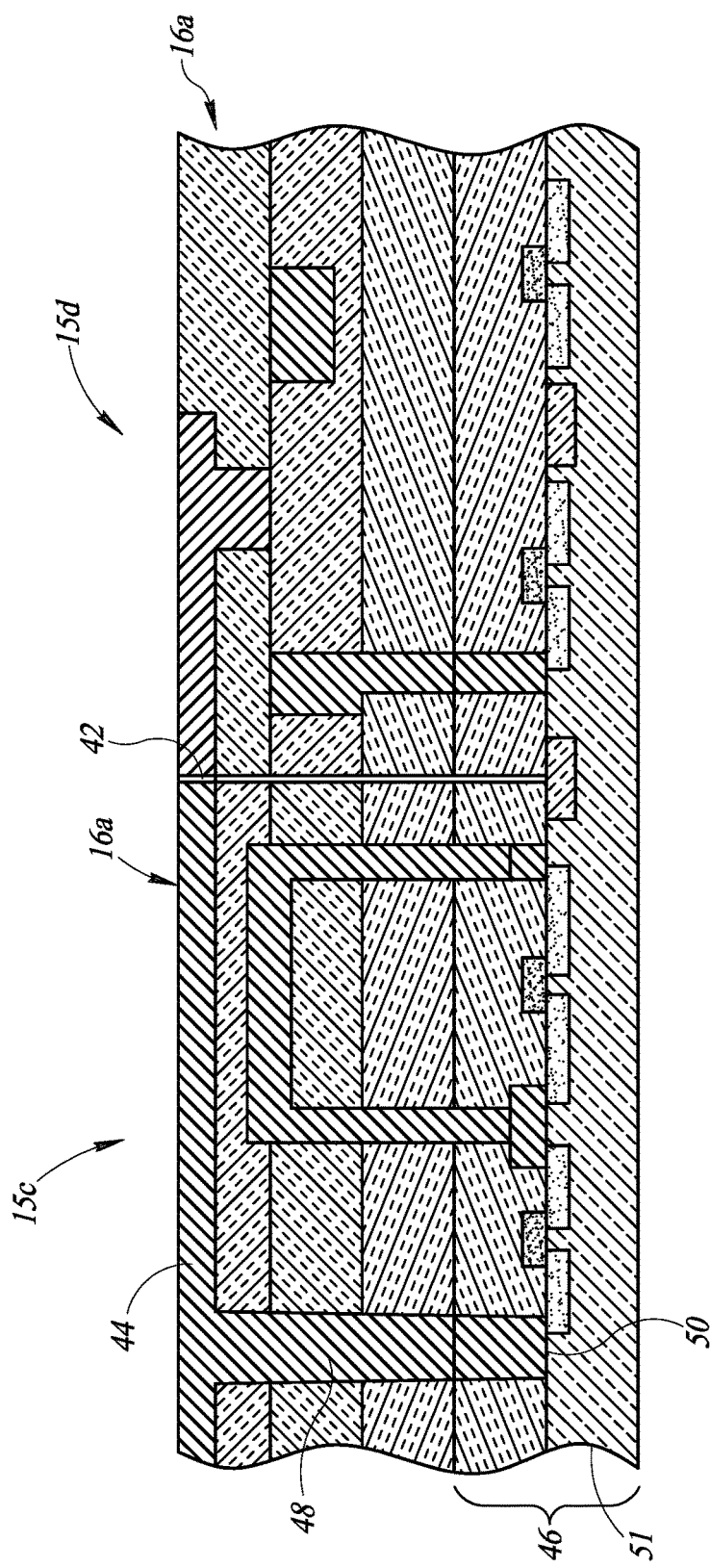
FIG. 3 is a cross-sectional view of an integrated circuit die in which adjacent partitions include abutting interconnection lines in a layer of metallization underneath the top surface of the chip, according to one embodiment described herein.

FIG. 3 shows a cross-sectional view of an exemplary junction 42 between partition 15c and a peripheral region 15d of the channel-less integrated circuit architecture 40, according to one embodiment. Generally, the channel-less integrated circuit architecture 40 may have in the range of eight to fifteen metal layers, with nine to twelve metal layer circuits commonly used. Interconnection lines for the bus 16a will usually be carried in the upper metal layers, just below the surface of the die, for example, metal layers 9-12 in a channel-less integrated circuit architecture 40 having twelve metal layers. In a channel-less integrated circuit architecture 40 that has ten metal layers, the interconnection lines for the bus 16a would normally be carried in layers 7-10. FIG. 3 shows exemplary interconnects in a top metal layer 44 abutting one another at the junction 42 between the partition 15c and the peripheral region 15d. It is not required that the abutting interconnects be in the top metal layer 44, however, it may be more convenient and efficient to use the uppermost metal layer 44 for the buses 16 in the channel-less integrated circuit architecture 40.

Buffer circuits are formed in a transistor layer 46 of the channel-less integrated circuit architecture 40. Therefore, vias 48 and contacts 50 are provided from the interconnection lines and the upper metal layers in order to extend down to the silicon substrate 51, provide an input signal to the buffer circuit, and then receive the refreshed output from the buffer circuit which is then placed back on the interconnection lines in the top metal layer and continues to pass along the bus 16a. This can be considered, in one respect, "punching through" the insulation layers that are between the top metal layer 44 and the substrate 51, and then commandeering for allocation to the buffer circuit a very small footprint, generally taking up 100-200 square nanometers of space for the buffer circuit that is electrically isolated from the rest of the circuits in a particular partition 15 or a component 12.

Figure 4:
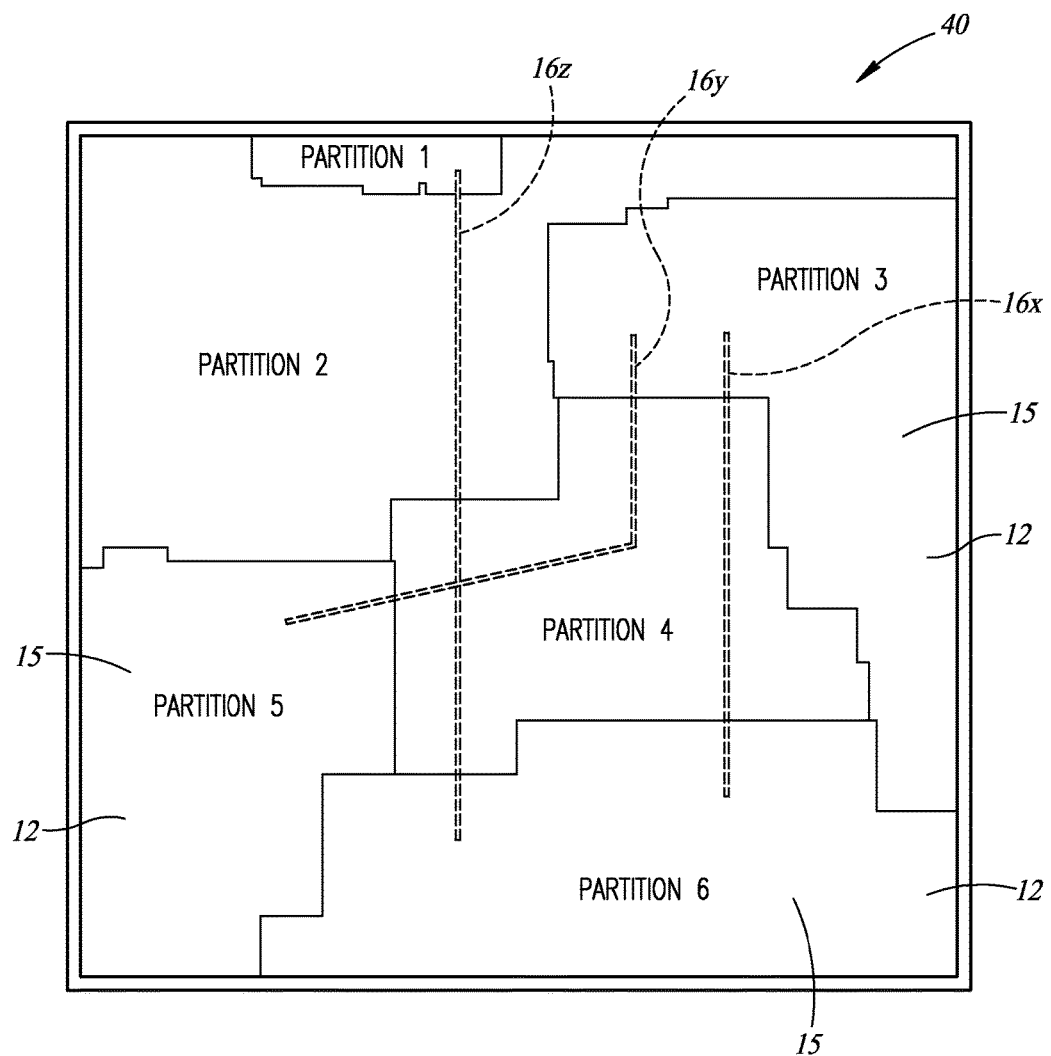
FIG. 4 is a schematic top plan view of an integrated circuit architecture divided into six design unit partitions according to the embodiments as disclosed herein.

FIG. 4 is a schematic example of a partition layout of the channel-less integrated circuit architecture 40, according to one embodiment. In the example in FIG. 4, six partitions 15 are shown, labeled as partitions 1-6. Each one of the partitions 1-6 contains one or more support components 12 and microprocessors 14 corresponding to those shown in FIG. 1. As can be seen in FIG. 4, the partitions 1-6 are shaped to be complimentary to one another so that they directly abut against each other with no space existing between partitions on the top level of the die. In particular, a number of rules are established in order to create an integrated circuit architecture having no channels, or, in some instances, very few channels. A first rule is that the partitions are all-inclusive units, meaning that all of the necessary contact pads, analog cells, clock sources, and the like, are located within a particular partition. A second rule is that only two pin nets are created at the top metal layer 44 with the specific rules for the interconnection wires that punch through the partitions 1-6 to make connections to the buffer circuits located in the silicon substrate 51. For example, the pin nets refer to specific metal layers, such as metal layers 8 and 9. Only these two metal layers are permitted to have vias and contacts that electrically connect to the buffer circuits and to those partitions through which the transmission lines pass but which do not originate or receive the signal. As can be seen in looking at FIG. 4, there are no wires or blocks at the very top level. Further, all partitions are formed with fully complimentary boundaries to directly and fully abut each other.

For clarity, only three buses 16 are shown in FIG. 4: 16x, 16y, and 16z. Bus 16x connects partition 6 to partition 3; bus 16y connects partition 3 to partition 5; and bus 16z connects partition 6 to partition 1. As can be appreciated, a standard channel-less integrated circuit architecture 40 will have many hundreds of interconnections, represented herein by only three such buses 16.

Viewing FIG. 4 in further detail, it can be seen that interconnection line 16z extends from partition 6, which is on the lower side of the chip across partitions 4 and 2 to reach partition 1. Interconnection line 16z is selected to provide the shortest possible path between circuits located in partition 6 that must be connected to circuits located in partition 1, without regard to the intervening partitions through which the bus line 16z passes. Moreover, signal routing is selected without regard to the types of circuits that the bus line 16z will pass through. Consequently, bus line 16z may pass through, for example, memory circuits because the middle interconnection lines that form the bus 16z are located at the upper metal levels, for example, metal levels 7-10, which are well above any of the operating circuits inside the individual partitions. Accordingly, these upper metal levels can be allocated for the bus line 16 to interconnect the various partitions to each other.

Figure 2A:
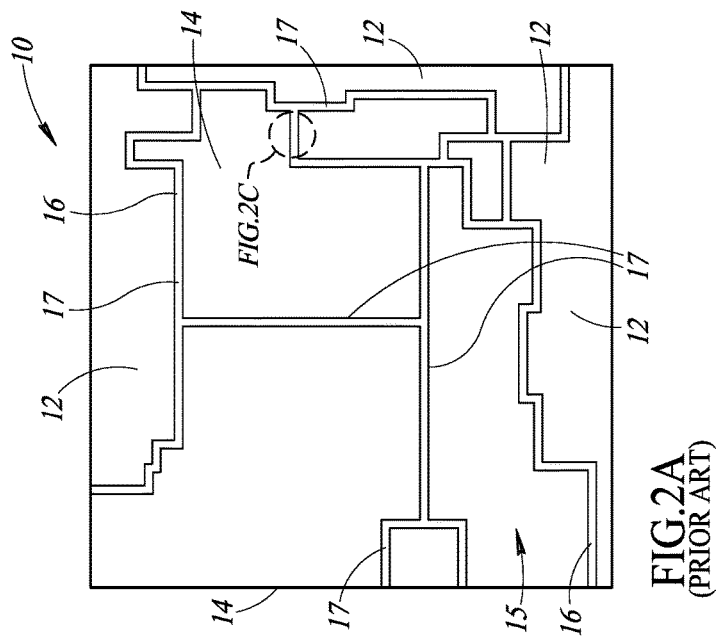
FIG. 2A is a top plan view of a conventional SOC layout that includes channels to carry the various interconnect lines.
Figure 2C:
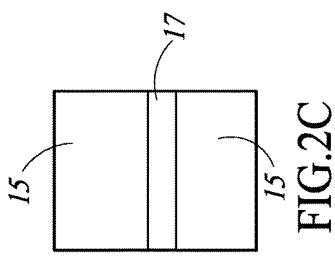

In one embodiment, the integrated circuit die can be considered as having a large number of logical units on the chip of different types. In broadly stated terms, both a microprocessor 14 and a support component 12 can each be considered a logical unit. Both of these components contain circuits that carry out logical functions and are composed of transistor logic and perform logic operations. Each of these logical units 12 and 14, is placed within a partition 15 and connected to other logical units, whether 12, 14 or another type of logical unit, with local interconnection lines that directly abut or with buses 16 as shown in FIG. 4. In the example shown, one partition 15 is connected to other partitions 15, each partition usually including logical units of both types, microprocessor components 14 and support components 12. In particular, the logical units of partition number 5 are connected to partition 3 along two interconnection lines labeled 16y. The logical units of partition number 6 are coupled to logical unit 12 of partition number 3 on interconnection line 16x. As can be seen, these interconnection lines 16 run directly from one partition to another, passing underneath other partitions. As previously discussed, when a signal must traverse the entire chip between opposite sides, as the signal leaves the first partition it may not have sufficient strength to reach the destination partition. In the prior art, such a situation was accommodated by having dedicated channels that contained buffer circuits to refresh and buffer the signals as they were carried along the channels. The channels were outside any of the partitions and were dedicated channel regions that contained the buffer circuits. According to the embodiments disclosed herein, rather than providing a separate channel that is dedicated to buffer circuits, and through which each of the interconnection buses 16 passes, there is a provision made to allocate a very small region, for example, a few hundred square nanometers of chip real estate, that is set aside near the center of a partition through which the line 16z passes in order to provide buffer circuits for the signal passing from partition 6 to partition 1. In particular, partition 4 will have one buffer circuit positioned approximately at its center, directly below line 16z in order to refresh and strengthen the signal traveling between partition 6 and partition 1. Partition 2 will also contain one or two buffer circuits directly below line 16z that are set aside as dedicated space, allocated within the partition and not used for the main function of the partition. For example, partition 2 may include a CPU having various microprocessor functions, with support components 12 including ROM, RAM, dedicated registers, and other circuits that are common to a microprocessor, or circuits which are dedicated for use in the components 12 that make up partition 2. The buffer circuits serving the transmission line 16z are not part of this component 12 but rather are established in a set-aside dedicated area that is just for the buffer circuit of the transmission line 16z. This does require some small amount of real estate in the silicon substrate, however, this is significantly less real estate than is necessary for the wide channels 17 that are used in the prior art as shown in FIGS. 2A and 2C. In particular, the bus line 16z does not extend through a dedicated region. Instead, nearly the entire path passes directly through useful circuits that are in partitions 4 and 2 and make up the functioning circuits of that partition. Only at one or two locations along its path is there a buffer circuit located directly underneath the interconnection path that receives the signal, refreshes it, and places it back on the transmission line 16.

Other examples of transmission lines shown in FIG. 4 include the bus line 16x that connects partition 6 to partition 3, and the bus line 16y that connects partition 3 to partition 5.

When an interconnection line 16 is long, such as 16z, one of the problems is that the signal loses strength as it passes from partition 6 on one side of the die to partition 1 which is on the other side of the die. Because of the distance which is required to be propagated, and the low voltage and current desired to be used, signals that travel between logical units must be reinforced, or otherwise refreshed at various locations between the two partitions in order to ensure that the signal is not lost due to noise, line losses, or other transmission problems. Accordingly, a number of buffer circuits are provided along the signal line 16z in order to refresh and strengthen the signal as it is carried on the interconnection lines from partition number 6 to partition number 1. A buffer circuit is any circuit which strengthens and refreshes the signal as it passes along the signal line. The buffer circuit used can be any one of the many buffer circuits known in the art today. Among the buffer circuits known in the art are a pair of CMOS inverters that receive an input slightly less than a full digital one and output a signal at a full digital one. Other buffer circuits include combinations of AND, NAND, OR and NOR gates. Buffer circuits that can both source and sink current are known, including those having either MOS and bipolar transistors or combinations thereof. The buffer circuit may be any one of a number of acceptable circuits, including an amplifier, a repeater circuit, a relay circuit, or any of a number of known circuits which receive a weak signal at its input, strengthen the signal by providing increased voltage or current or both, and then put the signal back on the transmission line, which has been restored to a higher, and in some cases, its original voltage and/or current levels so that it may continue to travel without loss toward its destination. The buffer circuits may, in some instances, include error correction, noise cancellation circuits, and other circuits, in order to ensure that the original signal which was sent by the first partition circuit 15 is properly refreshed and continues to be transmitted along the line towards its destination of partition circuit 15. A buffer circuit may, depending on the type of circuitry used, involve several dozen transistors in order to provide the proper amplification and buffering or, in some instances, may include several hundred or a few thousand transistors. An individual partition 15, for example, may be included in the range of 4-8 million transistors. The buffer circuits are placed at the necessary locations along transmission line 16z by providing connection vias, contacts, and interconnection lines from the line 16z down to the silicon substrate where the buffer circuits are located. A very small space is allocated out of the partition 15 over which the line passes in order to provide the buffer circuits for the line 16. Namely, a small amount of the area directly underneath the line 16 is set aside and not used by the partition 15 at a few locations inside that partition. This small area which may contain, as previously stated, several dozen transistors or, in some cases, a few hundred transistors, provides the buffer circuit which is dedicated for buffering the signal traveling on line 16 from partition number 6 to partition number 1. This area is therefore not used at the particular locations inside of partition numbers 4 and 2 in which the buffer is located but rather, is set aside for use as a buffering station for bus lines that pass over the partition. Generally, a long line such as 16z might have 3 to 5 buffer stations circuits. Therefore, at 3 (or maybe 5) different locations between partition 6 and 1, vias and contacts connect down to the substrate so that they can reach the buffer circuits located within partition number 4 and number 2. Some lines 16 might only need a single buffer circuit and some might have none. The buffer circuit logic takes up only a small space where it is located, which will mean that only a small area in the partition that holds the buffer circuit is set aside within each partition. Further, the buffer circuits are located only where they are needed and not along the entire length of each line 16.

Figure 5:
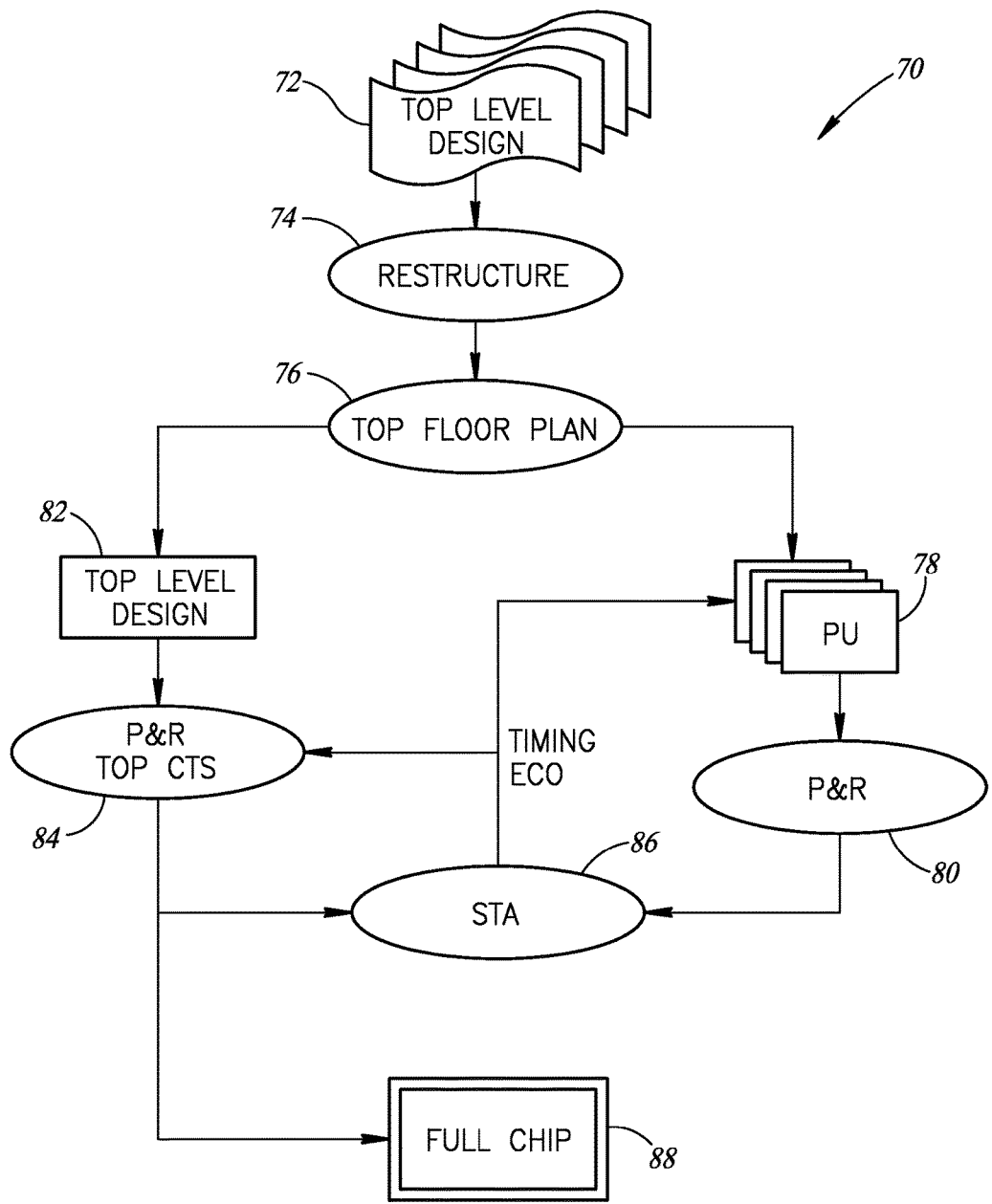
FIG. 5 is a flowchart of a circuit design process for circuits that include channels, according to the prior art.

FIG. 5 shows a sequence of steps in an existing design process 70 of a type commonly used today by integrated circuit design companies to organize and sequence tasks.

At 72, the individual processors 14 and support components 12 to be used in the conventional integrated circuit die 10 are initially designed. As previously explained, each integrated circuit chip contains a large number of components 12, and each component is sufficiently complex that a single team of design engineers is selected to design each component as a separate design unit. Thus, the power supply design unit may have a team of five to six designers, the CPU may have a team of a dozen designers, the various memories also may have between six and fifteen people on the design team. After each design unit is completed, it is checked and tested to ensure that it is ready for assembly into the final top level design for the channel-based integrated circuit architecture 10 as step 72 is completed.

At 74, the design units are organized into partitions 15. In some instances, more than one design unit may be located in a single partition. For example, normally all portions of the microprocessor 14 will be within a single partition that may also include various types of memory such as ROM, RAM, EEPROM and the like.

At 76, a top floor plan is laid out that specifies boundaries for each partition 15. The boundaries then define allowed locations of the various channels 17, between the partitions 15, that will route the interconnection lines between the design units. The bus architecture is then laid out and the channels 17 created as shown in FIG. 2A, to connect the various partitions 15 to each other.

At 78, after the top floor plan is completed, each design partition unit (PU), corresponding to a partition 15, is organized in as compact and efficient a manner as possible, and the location of connection pins is decided. The partition unit layouts are generated in parallel with one another.

At 80, the design partition units are arranged on the die by performing a place-and-rotate (P&R) operation.

At 82, in parallel with steps 78 and 80, the upper metal levels are designed so as to interconnect all of the partitions 15 according to the channel design.

At 84, the design continues with the placement and rotation of the upper metal layers according to the top level design, together with the clocks and the timing between the various partitions. A clock tree synthesis (CTS) operation couples clock signals to multiple synchronous elements, making use of a clock tree buffer. The clock tree buffer compensates for losses in timing, and this allows connecting a clock signal to a plurality of components.

At 86, a static timing analysis (STA) is performed to calculate how many buffers are needed along a particular communication path, and to confirm that the physical design layout meets pre-determined targets that will ensure proper circuit timing.

At 88, the full chip design is completed.

These are the steps of the current design process that is known in the art.

Figure 6:
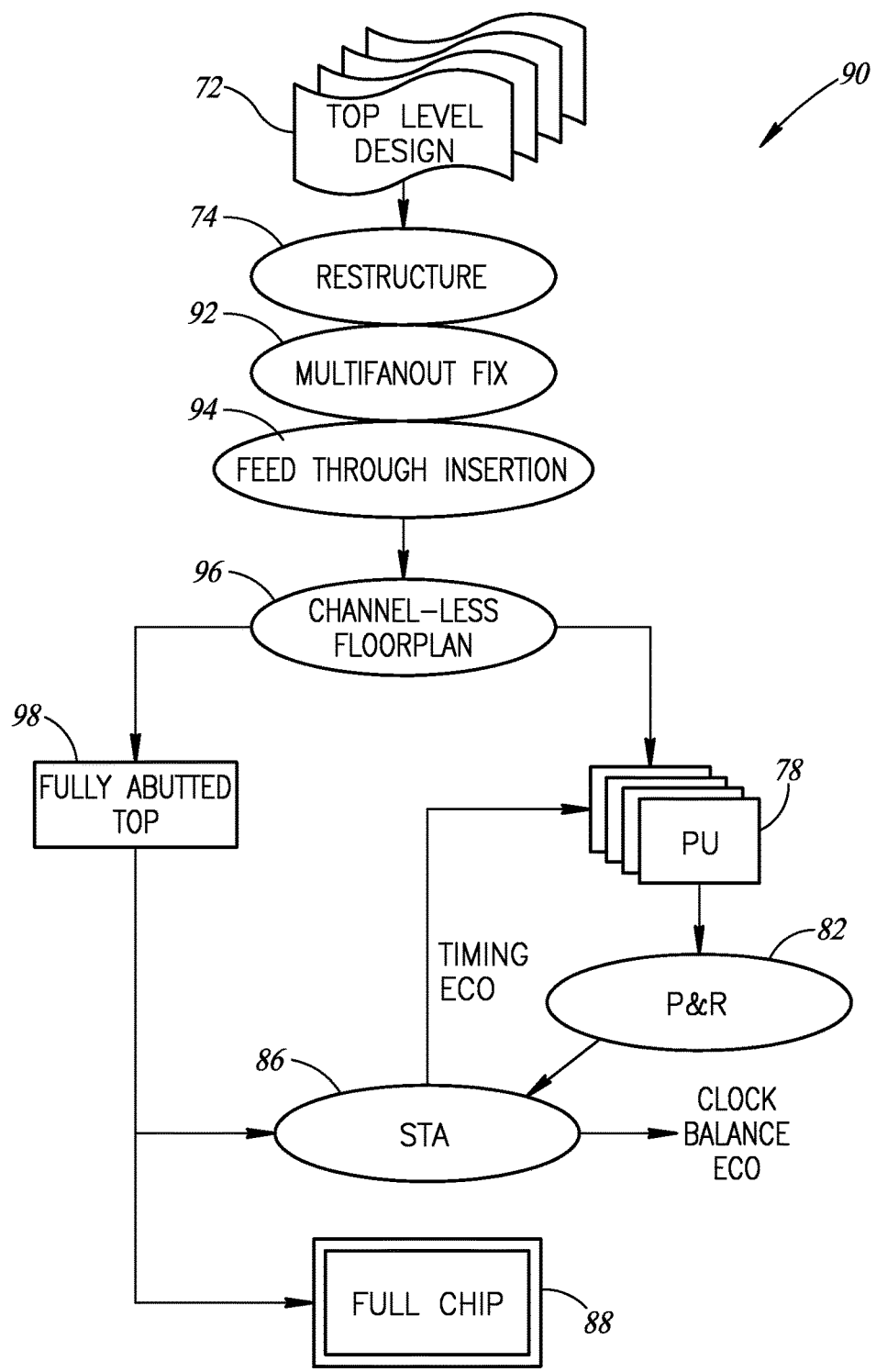
FIG. 6 is a flowchart of a channel-less circuit design process according to the steps as disclosed herein.

FIG. 6 shows a sequence of steps in a design method 90 for use in organizing tasks to create the channel-less integrated circuit architecture 40 by modifying the channel-based integrated circuit architecture 10. FIG. 6 illustrates the design steps for a chip in which the interconnection lines run directly between various components and partitions without the use of designed channels to carry the bus interconnect structures. The design method 90 is used to ensure that wiring is not present at the top level of the integrated circuit die 40. The design method 90 can be used to create a new chip design, or to adapt an existing channel-based chip design to create a channel-less design.

Steps 72 and 74 are generally the same as in the conventional design, in which design units for individual components 12 are formed in parallel at 72, and then the design units are organized into the target partitions in step 74. However, the rules for arranging the partitions at 74 are generally different for a channel-less design than for a channel-based design. Thus, at 74, the channel-less design is re-structured to arrange the partitions so as to include more or fewer design units.

Figure 7B:
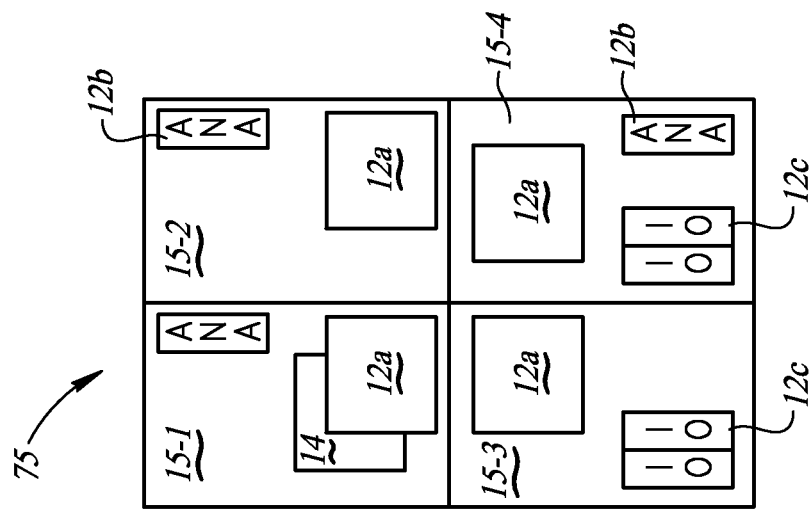
FIGS. 7A-7B illustrate a process of restructuring partitions according to embodiments as described herein.
Figure 7A:
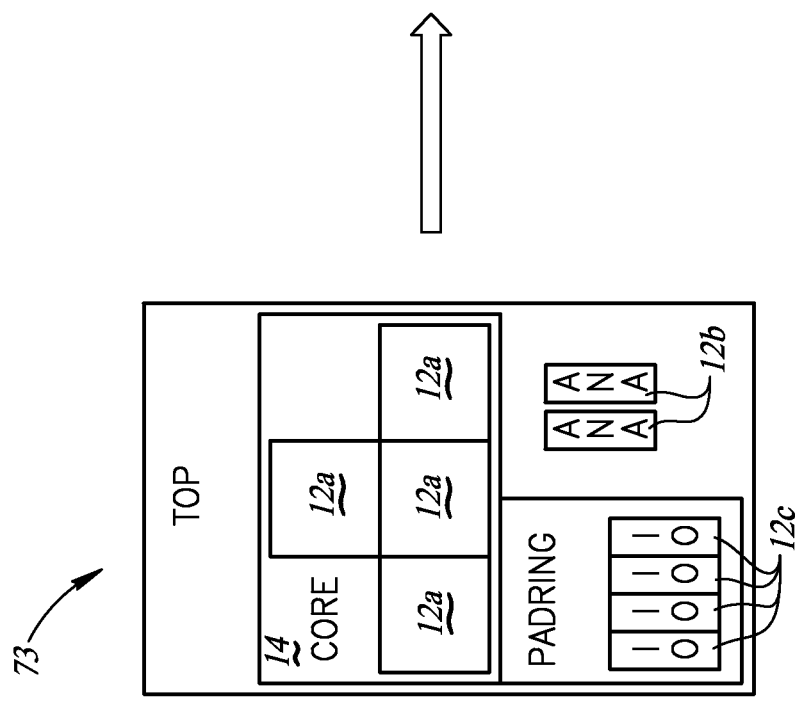

By designing the partitions to be all-inclusive and by placing partitions adjacent to one another based on their communication needs, the overall chip design can be made more efficient because interconnection lines are shortened or eliminated. For example, a conventional arrangement 73 of design units shown in FIG. 7A may be further re-arranged according to a channel-less layout 75 that includes partitions 15, labeled 15-1 to 15-4, as shown in FIG. 7B. There may be, for example, a total of 100 design units arranged into six partitions 15. In the channel-less layout 75, it is recommended that all circuits of the integrated circuit chip 40, such as the digital components 12a, analog components 12b, the I/O components 12c, the interface units, memory, power circuits, and the like, be grouped into a set of top level partitions such that individual design units do not remain outside of partitions in the top level design. In particular, the partitions 15 are designed to be all-inclusive units. All pads, analog cells, clock sources, and other support components that will be needed to support a core microprocessor 14 in a particular partition 15 are contained within that all-inclusive partition. The partitions 15, shown in FIG. 7B as 15-1, 15-2, 15-3, and 15-4 are organized so that boundaries of the top units are stretched to be complimentary to each other without any additional wiring required in a channel. No space is allowed between adjacent partitions on the top level of the chip. To the extent possible, adjacent units that frequently exchange signals are abutted against each other, for example, a main memory partition, such as SRAM or DRAM will directly abut against an associated CPU partition, which makes the most use of that memory. The input/output circuits will be at the edge of the chip and directly abut against the CPU which frequently accesses the input and output signals. The partitions can be shaped, organized, and stretched to abut against each other in any desired physical fashion, an example of which has previously been shown in FIG. 4.

Each partition 15-1 to 15-4 is then designed with an open connection available in at least one or maybe two upper metal layers, with space for available interconnection wires being left in the first design of the individual partition P1-P4. Preferably, all of the metal layers below the top three or four metal layers are contained within the partition itself. Two of the upper metal layers, such as layers 9 and 10, or, in a chip with fewer metal layers, layers 7 and 8, have room that is available and reserved for use by the net interconnection structure that forms the buses 16. In addition, during step 74, the initial layout is performed of the top-level nets that will provide the interconnection wires, which will connect one partition to another.

At 92, after the partitions are generally laid out, a multi-fan-out fix process is carried out. Rather than having many of the interconnection lines grouped together and passed as a single bus across the integrated circuit die 40 from one location to another, each individual circuit connection which is to carry a signal among partitions P1-P4 starts at the origin or termination of the signal and extends directly to the partition for the termination origin of the signal which is to be exchanged. In prior art designs, it is common to collect all of the interconnection lines into a common area so they take up a broad footprint across the die and are carried as a channel from one partition to another, or around the outer periphery of the integrated circuit die as shown in FIG. 2A. However, according to the channel-less design, it is preferred that just a few interconnection lines extend together from one partition to another. If one partition is connected to another partition by two separate interconnection lines that come from different parts of the partition, then separate paths are used and these are not required to be joined together.

Figure 8B:
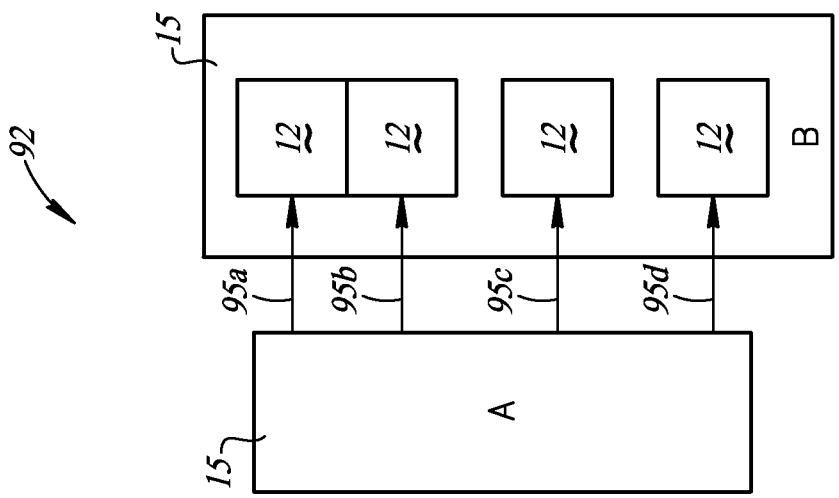
FIGS. 8A-8B illustrate a process of re-configuring multi-fan-out connections as one-to-one connections, according to one embodiment as described herein.
Figure 8A:
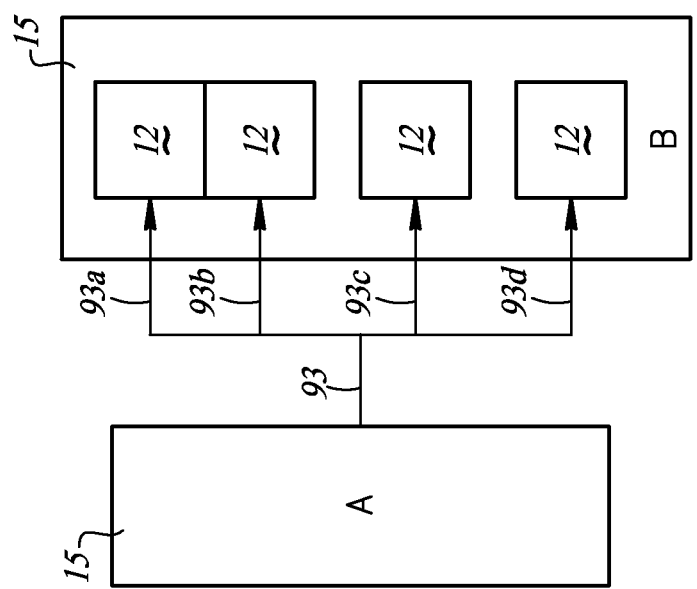

In the multi-fan-out fix step 92, connection fan-outs that were used in the channel-based integrated circuit die 10 are eliminated, as illustrated in FIGS. 8A-8B. FIG. 8A shows a one-to-four fan-out connection between a partition A and a partition B that is typically used in a channel-based design. The one-to-four connection includes an output pin 93 that fans out to multiple input pins 93a, 93b, 93c, 93d, each input pin coupling to a different component 12 in partition B. Such a connection can be reconfigured in a channel-less design by re-assigning the four-to-one fan-out to four one-to-one connections 95a, 95b, 95c, and 95d, as shown in FIG. 8B. The reconfiguration can be carried out automatically by a computer, by identifying multi-fan-out connections and specifying rules that disallow such connections.

At 94, a process of feed-through insertion is carried out in which preferred routing for the individual interconnection lines between partitions is determined and recorded as a feed-through specification. At this step, connections that would otherwise be routed to the nearest channel along the top surface of the chip are instead routed through a series of partitions 15 to a destination, via metal lines underneath the top surface of the chip. The metal lines in neighboring partitions abut one another, as shown in FIG. 3. Desirably, the feed-through specification is developed with input from a top-level physical designer, a chip architect, and a bus designer, to make the best decisions regarding which partitions will be suitable for feed-throughs. Variables to be considered in making feed-through decisions include pin density, floor plan, and the like.

Figure 9:
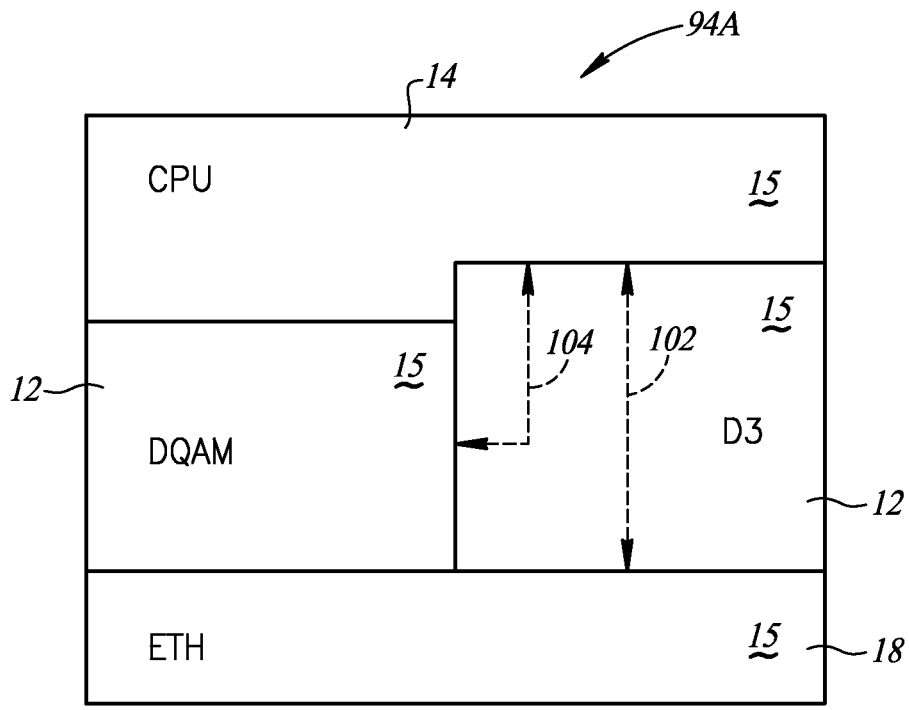
FIGS. 9-10 illustrates a process of feed-through insertion, according to embodiments as described herein.
Figure 10:
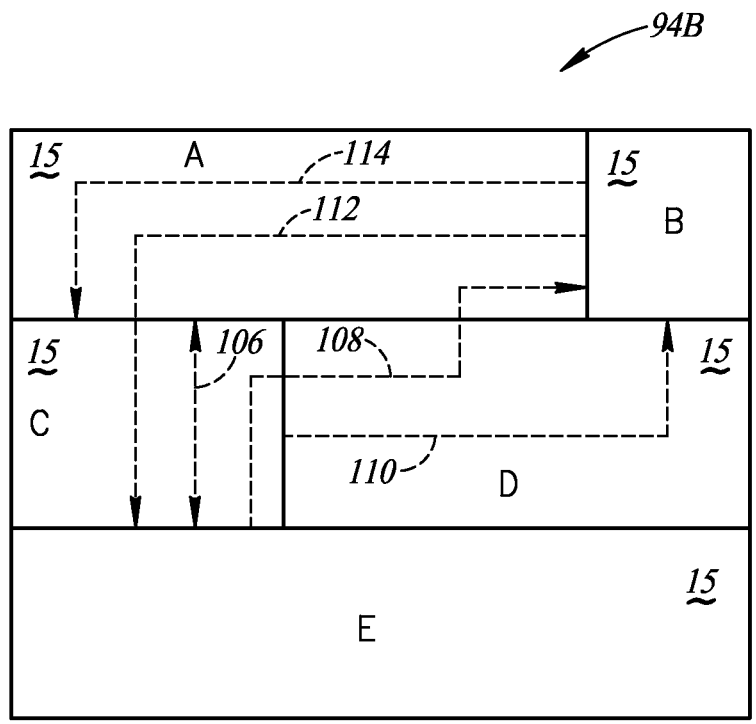

FIGS. 9 and 10 show net topologies 94A and 94B for examples of feed-throughs for non-adjacent partition connections made in step 94 followed by the channel-less floor plan layout. FIG. 9 shows a first exemplary net topology 94A in which two bi-directional feed-throughs 102 and 104 are inserted between four different partitions 15, as follows: a CPU partition, a DQAM partition, a D3 partition, and an ETH partition. A CPU partition is an example of a non-flexible partition that may require connections to be routed around it, while other types of partitions are more flexible in accommodating feed-throughs. The feed-through 102 connects the CPU partition to the ETH partition by traversing partition D3. Feed-through 104 connects the CPU partition to the DQAM partition, also by traversing partition D3. Both of the feed-throughs 102 and 104 provide connection paths in which signals can travel in either direction, indicated by double arrows. These feed-throughs can be specified in a feed-through table such as Table I. A feed-through table is a rule table that facilitates generating feed-throughs automatically by a computer code. It is noted that adjacent partitions do not need feed-throughs. The pins of bus lines located in adjacent partitions are abutted to one another without a feed-through. Table I can be further specified as a list for processing scripts.

TABLE I

A Feed-Through Table Lists Rules for Connecting Partitions Without Using Channels

| From | To | Through |
|---|---|---|
| Cpu | Eth | D3 |
| Dqam | Cpu | D3 |

TABLE I-continued

A Feed-Through Table Lists Rules for Connecting Partitions Without Using Channels

| From | To | Through |
|---|---|---|
| D3 | Cpu | None |
| D3 | Dqam | None |
| D3 | Eth | None |

FIG. 10 shows a second exemplary net topology 94B in which five feed-throughs 106, 108, 110, 112, and 114 are inserted among five different partitions 15, labeled A, B, C, D, and E. A feed-through code will create paths through each partition to implement rules shown in Table II: The bi-directional feed-through 106 connects partition A to partition E by traversing partition C. The uni-directional feed-through 108 connects partition E to partition B by traversing partitions C, D, and A. The uni-directional feed-through 110 connects partition C to partition B by traversing partition D. The uni-directional feed-through 112 connects partition B to partition E by traversing partitions A and C. The uni-directional feed-through 114 connects partition B to partition C by traversing partition A.

Preferably, the interconnection lines are laid out automatically, according to the various rules encoded in feed-through tables exemplified by Tables I and II. Once the necessary connections are specified, the computer software will perform the feed-through insertion in the channel-less floor plan layout.

TABLE II

A Feed-Through Table Lists Rules for Connecting Partitions Without Using Channels

| From | To | Through |
|---|---|---|
| A | E | C |
| B | C | A |
| C | B | D |
| B | E | A, C |
| E | B | C, D, A |
| A | B | None |
| A | C | None |
| A | D | None |
| B | D | None |
| C | D | None |
| C | E | None |
| D | E | None |

At 96, after the partitions are defined and the interconnections among the partitions are specified, some transistors and circuits in each partition A-E are slightly rearranged to create a channel-less floor plan that includes buffer circuits. When circuits within the partitions are rearranged, buffer circuits may also need to be re-arranged. For example, clock buffers that would be located along channels in a conventional design are moved to within partitions in the present channel-less design. Because the partitions 15 are all-inclusive, both clock generators and clock buffer circuits are located within each partition so they can be closer to one another. However, the area within the partition that is needed for the buffer circuits is very small. Namely, each partition A-E will normally have in the range of 4-6 million transistors. A buffer circuit will, on the other hand, have between several dozen and a few hundred transistors. Therefore, following the feed-through insertion step 94, some slight rearranging and movement of some of the circuits in the partitions A-E are made to make room for the contacts and vias and the transistors which make up the buffer circuit.

The location of the buffer circuits is selected to be where it will not cause disruption of the partition A-E that is being used to provide the buffer circuit silicon. For example, a buffer circuit will not be placed in the center of the memory array of any memory, such as an SRAM, DRAM, EPROM, or the like. It can, of course, be placed in the middle of the address buffers where there is frequently excess room. It may also be placed in the peripheral circuitry, adjacent to the redundant or backup circuitry, where there is frequently excess room, and also adjacent to the backup address circuitry or lasers which are below to provide the redundant circuit connections.

In partitions A-E which the conduction buses 16 cross but do not exchange signals or data on that particular connection line buffer circuits are placed at the feed-through insertion locations. Each particular interconnection wire is considered for its length and routing location to determine whether or not buffer circuits or any appropriate amplifiers will be needed. Since the partitions A-E abut each other, in many instances either no interconnection lines are required or very short interconnection lines will be used, thus buffer circuits may be avoided in many instances. However, in partitions that are separated from each other by a distance encompassing most of the chip, at least three and sometimes five buffer circuits will be needed in order to reenergize a signal to ensure that it has sufficient voltage and current when it arrives at the destination partition A-E. Only two metal interconnection wires, namely two pin nets, are created at the upper level metal layers using specific wires for punching through the partitions A-E to obtain access to a small area of silicon in which the custom buffer circuit will be built that is segmented from the rest of that partition. Namely, each partition A-E will have a very small area, such as a few hundred square nanometers which are set aside for use in the buffer circuits that will be used to amplify and resend the signal on any of the paths 16 that cross through that partition A-E but which do not exchange signal or data with that partition.

Buffer usage is determined according to which connection lines need buffers and where the buffers are generally to be located. The specification for each of the partitions is slightly eased in order to permit the appropriate buffer circuit to be placed in the silicon. Verification of the feed-through specification then occurs. The nets can transfer as multiple partitions. For example, as shown in FIG. 4, the network of interconnection lines that connects partitions can extend from partition 6 to partition 1 and pass through partition 4. Similarly, signals can travel in the reverse direction from partition 1 to partition 6 and have the buffer circuits in partition 4.

At 98, after the locations for the interconnections and the locations for the buffer circuits as needed are determined, then the channel-less floor plan design is laid out to complete the fully abutted top design. The partitions 1-6 are then selectively placed in the integrated circuit die 40 in a final pattern as shown in FIG. 4 to be fully abutted at all of the lower and mid-level metal layers. Namely, partitions that will be connected at any of the metal layers lower than the top two or three layers are closely adjacent to each other to avoid the use of unnecessary interconnection lines. The channel-less floor plan will make use of two metal layers that act as a net to carry the interconnections that form the buses 16 to connect the partitions 1-6 to each other. Individual buses 16 are separated as much as is practical. Accordingly, the channel-less floor plan layout is completed.

Finally, the step 78 of organizing partitions 15 into partition units, the P&R step 82, and the static timing analysis step 86 are carried out towards design of the full chip as previously explained with respect to the prior art. During the STA process 86, precise design rule checking (DRC) and verification can be done using computer-aided design (CAD) tools to ensure that the channel-less design is compliant with the rules it is intended to implement. In addition, fixed I/O conditions can be defined on partition ports that translate to real physical constraints.

Figure 11:
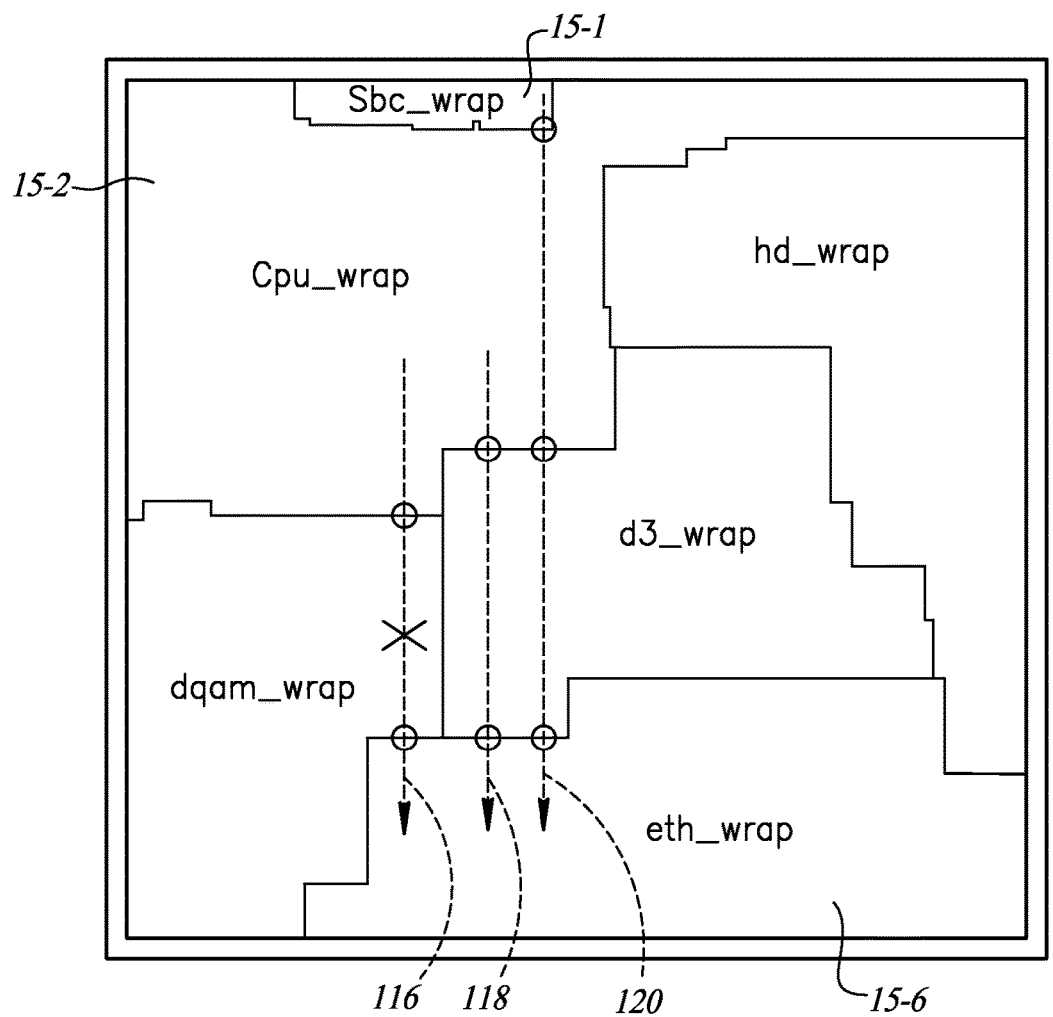
FIG. 11 illustrates a violation of a feed-through insertion rule as detected during an automated verification process.

FIG. 11 illustrates an exemplary violation of the feed-through rules that is detected during an automated checking procedure. FIG. 11 shows a chip having partitions arranged as shown in FIG. 4, as an example. An interconnection 116 is routed from the CPU partition to the ETH partition through the DQAM partition. The interconnection 116 violates a feed-through rule, as indicated by an "X". Two alternative routing options exist as shown: a first connection 118 that passes through D3 instead of DQAM, and a second connection 120 that passes from a SBC partition through the CPU and D32 partitions, to the ETH partition.

Figure 12:
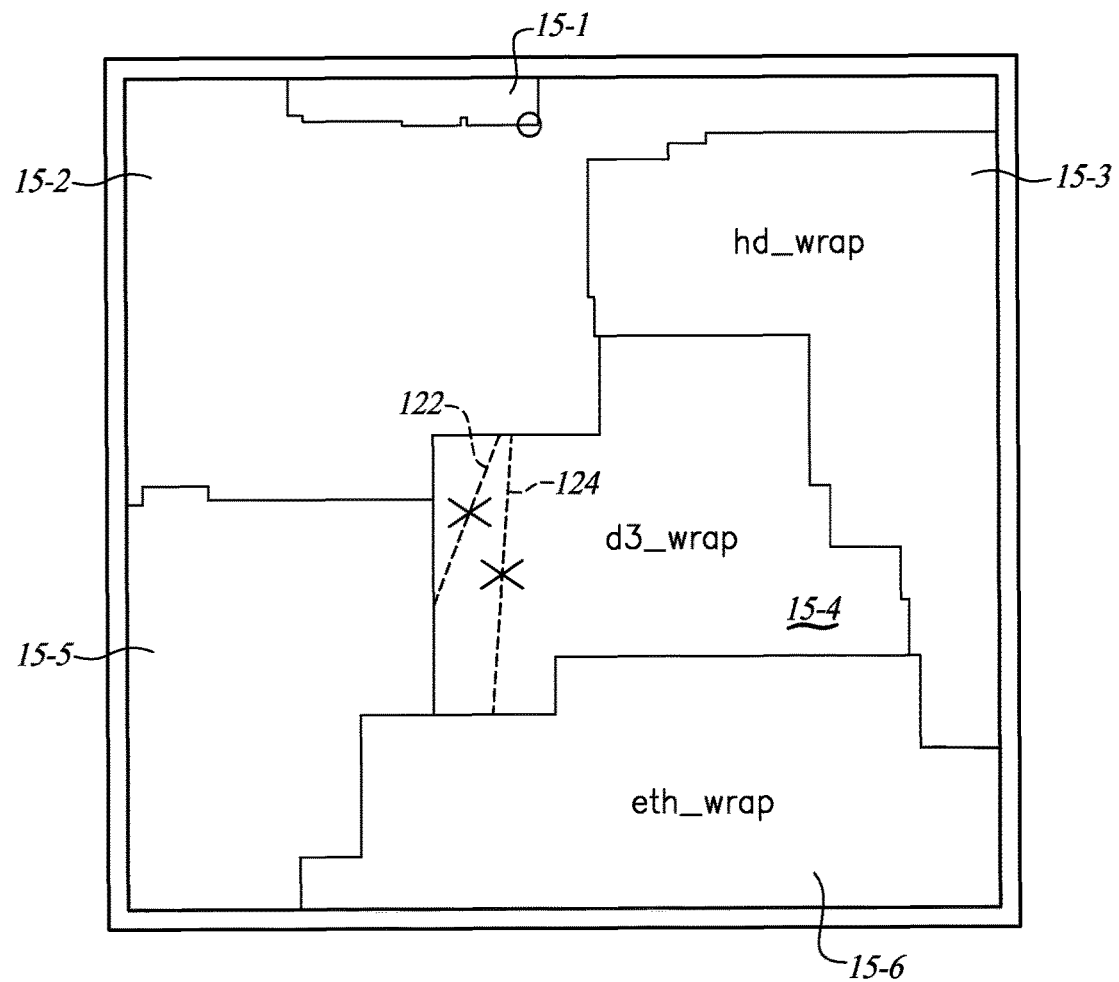
FIG. 12 illustrates a violation of a multi-fan-out rule as detected during an automated verification process.

FIG. 12 illustrates an exemplary violation of the multi-fan-out rule that has been detected using an automated verification tool. The violation is identified as being located in partition D3 and is flagged for correction. In particular, a connection line originating in partition 15-2 is shown as fanning out to two connection pins, one connecting to partition 15-5 (122) and the other connecting to partition 15-6 (124). The 1:2 fan-out is flagged as indicated by the X's located in the intervening partition 15-4. The violation can then be corrected by repeating the multi-fan-out fix process at step 92 in which two one-to-one connections are specified to replace the 1:2 fan-out.

Figure 13:
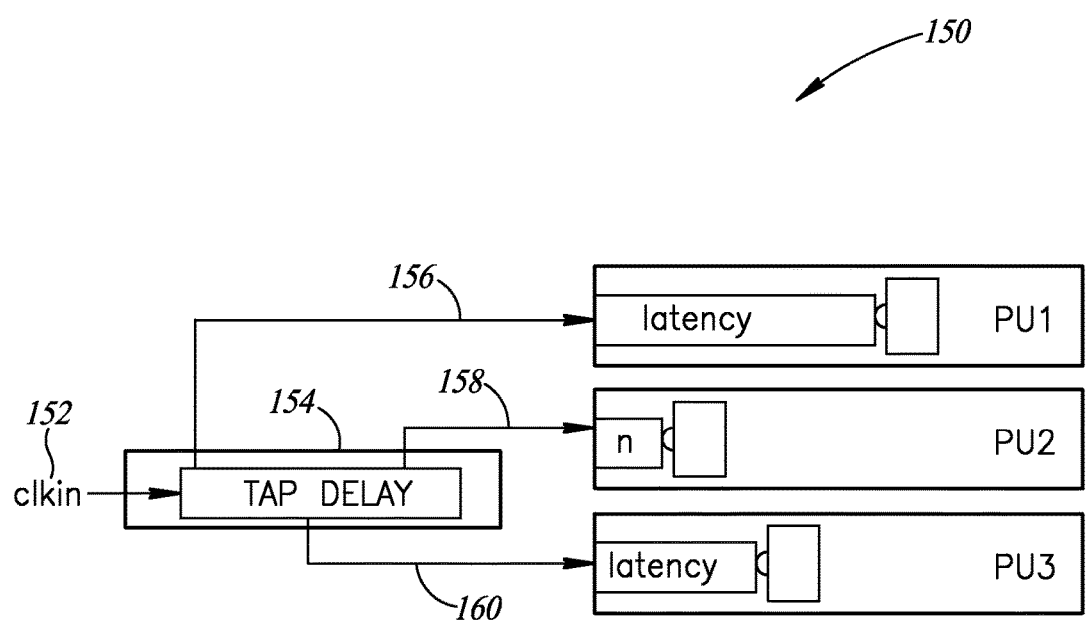
FIG. 13 illustrates an automated process of clock balancing according to embodiments of the present disclosure.

One of the differences between the methods 70 and 90 is that clock balancing is handled differently. An exemplary clock-balancing scheme 150 for use in the method 90 is shown in FIG. 13. The clock-balancing scheme 150 ensures that timing is correct between partitions by introducing delays between clock buffers placed along a connection path between partitions. The clock buffers may, for example, be spaced apart by 100-micron intervals along a conventional channel. However, because the partitions 15 are much closer to each other and the individual bus lines are in different locations in the channel-less design, less clock balancing is required. Consequently, clock buffers may only need to be placed every 200 microns along a fully abutted interconnect line.

With reference to FIG. 13, a synchronous clock signal 152 is provided to multiple partition units PU1, PU2, and PU3 using a channel-less clock-balancing scheme 150. A tap delay 154 is then applied to the clock signal 152 to create branches, or independent clock signals 156, 158, and 160 that can be pushed separately to each partition unit. A balancing architecture is provided to determine the correct tap delays. If there are circuits within the partition unit that need particular timing, appropriate latency circuits are provided for the clock to ensure proper clock timing in each of the partitions. Of course, the individual design teams for each partition unit will try to achieve a minimum clock insertion delay. When the partition clocks have been tested and are stable, tap delays at the root of the clock are adjusted to balance the various segments within each partition unit. Tap delays can be adjusted by issuing engineering change orders (ECOs) to the design as needed.

One feature that is permitted according to the designs explained herein is that the tap delay provides a required range to delay or de-skew different levels of the clock with a minimum area and variability. Any delays in the clock or tap delays in the clock connections should be transparent to the individual partition units and should provide quick verification. One possible solution is to use the clock delay circuit with a basic cell that is a chain of delay buffers with a fixed load. This can be used to balance the clock or the clock latency within the partition or between partitions as needed. Further, a cell is provided which contains a tap delay inside with multiple tap delay instances. If a user in a particular partition needs clocks having different delays, the individual taps of the cell can be accessed to get a clock with the appropriate timing and phase delay. Each tap delay provides one clock input and multiple clock outputs that are controlled by the overall clock of the integrated circuit. The clock balancing circuit only affects wiring changes inside a particular partition. This permits the isolation of clock changes for balancing from one partition to another and permits the delay cell to be contained only within a particular partition itself. This makes the design turnaround time for clock balancing very quick.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a channel-less integrated semiconductor circuit die, including:
      a semiconductor substrate;
      a transistor layer formed on and in the substrate;
      a plurality of metal layers on the transistor layer, a first metal layer of the plurality of metal layers being spaced from the transistor layer by remaining metal layers of the plurality of metal layers;
      a plurality of logical units having transistors in the transistor layer, each of the plurality of logical units occupying a selected region on the semiconductor substrate;
      an interconnection bus formed in the first metal layer, the interconnection bus electrically couples a first logical unit of the plurality of logical units to a second logical unit of the plurality of logical units;
      a buffer circuit in the transistor layer, the buffer circuit electrically coupled to the interconnection bus, the buffer circuit, in operation, receives a first signal from the first logical unit outputs a second signal to the second logical unit, the buffer circuit being located within the same region as a third logical unit of the plurality of logical units, the buffer circuit being electrically isolated from the third logical unit; and
      a plurality of electrically conductive vias and contacts that extend from the first interconnection bus, through the remaining metal layers of the plurality of metal layer, and to the buffer circuit.

2. The device of claim 1 wherein the first logical unit is a microprocessor and the second logical unit is a support component for the microprocessor.

3. The device of claim 1 wherein the third logical unit and a fourth logical unit are positioned between the first logical unit and the second logical unit, and the interconnection bus extends from the first logical unit, across the third and fourth logical units, and to the second logical unit.

4. The device of claim 1 wherein the third logical unit is backup circuitry for one of the plurality of logical units.

5. The device of claim 1 wherein the first metal layer is a metal layer that is immediately below a surface of the integrated semiconductor circuit die.

6. The device of claim 1 wherein the first signal has a data value and a first power level, and the second signal has the data value and a second power level that is greater than the first power level.

7. A device, comprising:
   a channel-less integrated semiconductor circuit die, including:
      a semiconductor substrate;
      a plurality of partitions;
      a plurality of metallization layers on the substrate;
      a plurality of integrated circuit components having transistors formed in the semiconductor substrate, each of the plurality of integrated circuit components occupying each distinct partition of the plurality of partitions;
      an interconnection bus electrically coupled between a first integrated circuit component in a first partition of the plurality of partitions and a second integrated circuit component in a second partition of the plurality of partitions, the interconnection bus extending across third and fourth partitions of the plurality of partitions, the interconnection bus being formed from at least a first layer of the plurality of metallization layers, the first layer being spaced from the substrate by at least a second layer of the plurality of metallization layers;
      first and second buffer circuits electrically coupled to the interconnection bus, the first and second buffer circuits positioned in the third and fourth partitions, respectively; and
      a plurality of interconnection vias and contacts that electrically couple the first and second buffer circuits to the interconnection bus.

8. The device of claim 7 wherein the plurality of integrated circuit components include one or more of a microprocessor, a graphics processor, a digital signal processor, a memory array, a bus bridge, and a peripheral logic block.

9. The device of claim 7, wherein the first buffer circuit, in operation, receives a low strength signal having a data value that is transmitted from the first integrated circuit component in the first partition to the second integrated circuit component in the second partition, the first buffer circuit, in operation, outputs a high strength signal having the data value.

10. The device of claim 7, further comprising a clock buffer circuit coupled to the interconnection bus, the clock buffer circuit, in operation, receives a digital clock signal having an input voltage level, and outputs a delayed clock signal having an output voltage level substantially equal to the input voltage level.

11. A device, comprising:
a channel-less integrated semiconductor circuit die, including:
a semiconductor substrate;
first, second, and third partitions, the third partition positioned between the first and second partitions;
first, second, and third logical units having transistors formed in the semiconductor substrate, the first, second, and third logical units positioned in the first, second, and third partitions, respectively;
an interconnection bus electrically coupled between the first logical unit and the second logical unit, the interconnection bus passing over the third logical unit, the interconnection bus including:
first, second, and third interconnection lines positioned in the first, second, and third partitions, respectively, the third interconnection line directly abutting the first and second interconnection lines; and
a buffer circuit electrically coupled to the interconnection bus and positioned in the third partition.

12. The device of claim 11 wherein the first logical unit is a microprocessor and the second logical unit is support component for that microprocessor.

13. The device of claim 11 wherein the channel-less integrated semiconductor circuit die further includes:
a fourth partition; and
a fourth logical unit having transistors formed in the semiconductor substrate, the fourth logical unit positioned in the fourth partition, the third and fourth partitions positioned between the first partition and the second partition.

14. The device of claim 11 wherein the buffer circuit receives as an input a low power signal having a data value that is being transmitted from the first logical unit to the second logical unit and the buffer circuit outputs a high power signal having the same data value.

15. The device of claim 11, further comprising a plurality of electrically conductive vias that extend from the interconnection bus to the buffer circuit.

16. The device of claim 11 wherein the buffer circuit is physically isolated from circuitry formed in the third logical unit.

17. A channel-less integrated semiconductor circuit die, comprising:
first, second, and third partitions, the third partition positioned between the first partition and the second partition, borders of the third partition directly abutting borders of the first and second partitions;
a substrate;
first, second, and third logical units positioned in the first, second, and third partitions, respectively, the first, second, and third logical units including electrical components formed in the substrate;
an interconnection bus that electrically couples the first logical unit and the second logical unit to each other, the interconnection bus extending from the first partition, across the third partition, and to the second partition; and a buffer circuit electrically coupled to the interconnection bus, the buffer circuit, in operation, amplifies a signal transmitted on the interconnection bus.

18. The channel-less integrated semiconductor circuit die of claim 17 wherein the interconnection bus is spaced from the substrate by a plurality of conductive levels.

* * * * *